United States Patent [19]
Wyatt

[11] Patent Number: 5,219,063
[45] Date of Patent: Jun. 15, 1993

[54] CONVEYOR BELT ALIGNMENT MAINTENANCE DEVICE

[75] Inventor: Paul Wyatt, Greenfield, Ind.

[73] Assignees: Wyatt Group, Inc., Greenfield, Ind. ; a part interest; Gordon Belt Scrapers, Benton, Ill. ; a part interest

[21] Appl. No.: 908,377

[22] Filed: Jul. 6, 1992

[51] Int. Cl.⁵ ............................................. B65G 15/64
[52] U.S. Cl. .................................................. 198/840
[58] Field of Search ......................................... 198/840

[56] References Cited

U.S. PATENT DOCUMENTS

| | | | |
|---|---|---|---|
| 2,828,854 | 4/1958 | Cibula, Sr. | 198/840 |
| 3,807,246 | 4/1974 | McIllwain | 198/840 X |
| 3,858,710 | 1/1975 | Spodig | 198/840 X |
| 4,221,480 | 9/1980 | Spehrley, Jr. | 198/840 X |
| 4,421,228 | 12/1983 | Marsiglio et al. | 198/840 X |

FOREIGN PATENT DOCUMENTS 108907  2/1968  Denmark ............................ 198/840

*Primary Examiner*—D. Glenn Dayoan
*Attorney, Agent, or Firm*—Kinzer, Plyer, Dorn, McEachran & Jambor

[57] ABSTRACT

An alignment maintenance device has one or two guide members mounted on the roller of a conveyor system to counteract any tendency of a conveyor belt to move laterally. The guide member has a split sleeve including a cylindrical hub and radial flanges. The flanges are bolted together to clamp the sleeve tightly on the roller adjacent the conveyor belt. A dome-shaped disc is fixed to the inside edge of the sleeve, placing it between the sleeve and conveyor belt. The disc prevents the belt from moving laterally on the roller.

5 Claims, 1 Drawing Sheet

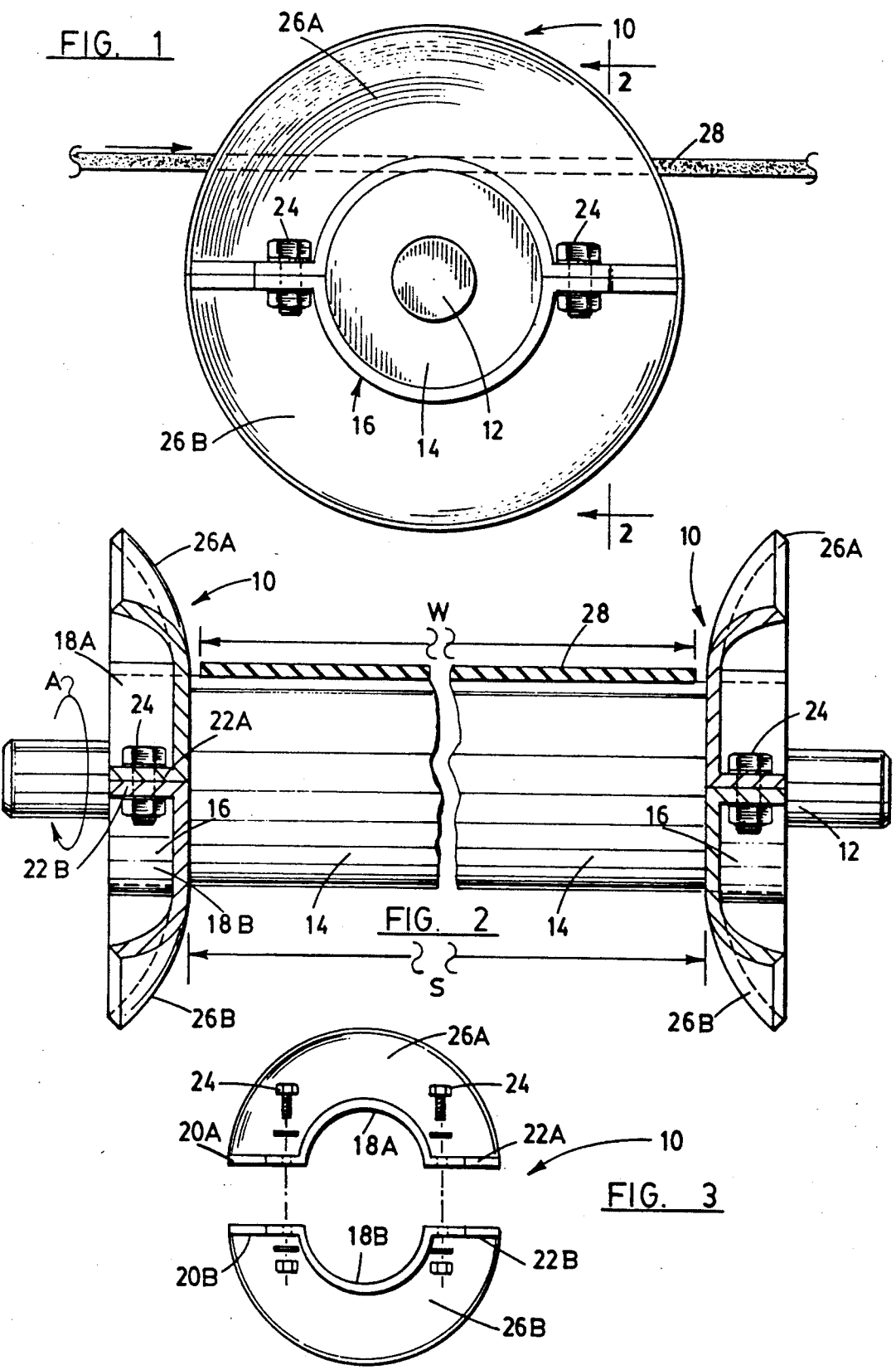

CONVEYOR BELT ALIGNMENT MAINTENANCE DEVICE

SUMMARY OF THE INVENTION

This invention relates to conveyor belts and is particularly concerns a device for maintaining alignment of a moving conveyor belt. The invention is primarily directed to heavy duty belts of the type used in mining operations, but it is not limited thereto.

Ideally a conveyor belt would stay in place on its supporting rollers, such as return idlers and the like. As a practical matter, however, this does not happen. Conveyor belts tend to shift laterally on the rollers, i.e., they move from side to side. If this movement is sufficient, and it may well be on a long conveyor run, the belt may actually "walk" off of its support rollers. An object of the present invention is to prevent conveyor belt misalignment on its rollers.

Another object of the invention is to increase belt life by eliminating damage to the belt edges which can occur when a misaligned belt contacts the fixed brackets which support the rollers.

A further object of the invention is to provide flexibility in installation of the alignment device. This is accomplished with a device that can be installed anywhere along the length of a support roller, thereby accommodating any belt width. The device of the present invention is also easily moved from one unit to another in a minimal amount of time. The device can be sized for use on a variety of roller diameters.

These and other objects which may appear in the following description are realized by a conveyor belt alignment device having pair of guide members having mounting means each of which carries a disc member. The guide members are mounted on a roller spaced apart such that the disc members are separated by a distance greater than the width of the belt.

The mounting means is a split sleeve having a hub portion and mating flange portions. The hub has two semi-cylindrical halves which can be clamped anywhere on the roller. Bolts connect the flange portions to clamp the sleeve on the roller. Thus, the sleeve is mounted for rotation with the roller but the sleeve does not move relative to the roller.

A dome-shaped disc is attached to the sleeve adjacent an edge of the sleeve. This arrangement places the disc between the sleeve and the belt when the sleeve is installed. The disc is then engageable with the edge of the belt if the belt should start to "walk" toward the guide member. This maintains the lateral alignment of the belt on the support member. The disc also prevents contact between the sleeve and the belt so that the flanges do not interfere with the motion of the belt.

BRIEF DESCRIPTION OF THE DRAWINGS

FIG. 1 is a side elevation view of the alignment device, looking transversely of the conveyor belt.

FIG. 2 is an end elevation view of the alignment device, looking longitudinally of the conveyor belt along line 2—2 of FIG. 1.

FIG. 3 is a detail elevation view of components of the alignment maintenance device.

DETAILED DESCRIPTION OF THE INVENTION

FIGS. 1 and 2 illustrate the alignment maintenance device of the present invention. It includes at least one guide member 10. If it is known that a belt will only "walk" in one direction, then a single guide member could be used to counteract that tendency. FIG. 2 shows an installation having two guide members 10, one near each end of the roller. The guide members are separated by a distance S. The width of the belt is W. The guide members are located such that separation S is greater than width W. The two guide members shown in FIG. 2 are identical except for being mounted in different directions. The guide members may be made of metal or urethane.

The apparatus on which the guide members 10 are used includes a shaft 12 which supports a roller 14. The roller 14 supports a conveyor belt 28. It is anticipated the guide members 10 will most commonly be mounted on return idler rollers, but the invention could be used on any roller in a conveyor system. Brackets and bearings which rotatably support the shaft 12 and roller 14 are not shown but it will be understood that roller 14 is rotatable as shown by arrow A.

Each guide member 10 has a mounting means which includes a split sleeve 16. The sleeve is defined by an arcuate hub portion and radially-extending flanges. Since the sleeve is split, there are upper and lower hub halves 18A and 18B, as best seen in FIG. 3. Each hub half is semi-cylindrical. The upper half 18A has flanges 20A and 22A while lower hub half 18B has flanges 20B and 22B. The flanges have a inner portion with bolt holes therein and an outer portion which angles or flares out to the outer circumference of the guide member.

When assembled the flanges 20A,B and 22A,B are fastened together by bolts 24 (FIG. 1). The inside diameter of the hub is chosen to match or nearly match the outside diameter of the roller so that a snug fit of the hub is achieved when the bolts 24 are tightened. While the snug fit of the hub about the roller as in FIG. 1 is preferred, it will be understood that the guide member could be equally effective with other shapes or sizes of the hub. For example, the hub need not necessarily be cylindrical. Or, if cylindrical, the hub halves need not be extend fully 180 degrees. It could be somewhat less in which case the flanges would not fit together face-to-face; there would be a gap between the flanges. So while the shape of the hub could vary, it is important that the shape permit sufficient clamping force to fix the sleeve to the roller and allow the guide member to resist the lateral forces that may be generated by the belt.

The guide member 10 further includes a disc connected to the sleeve 16 at one edge of the sleeve. Like the sleeve, the disc is split into an upper half 26A and a lower half 26B. The sleeve is connected along the entire length of diametral split line of the disc. That is, as best seen in FIG. 3, the flanges 20, 22 and hub 18 extend from one circumferential edge of the disc to the other. This helps strengthen the disc.

The disc has a curved or dome-shaped configuration as seen in FIG. 2. The concave portion faces outwardly or away from the conveyor belt 28. The disc could be turned around to have the concave portion facing inwardly. The curvature of the disc is intended to strengthen it.

It will be noted that the connection of the disc 26 to the sleeve 16 at a lateral edge of the sleeve places the disc between the belt 28 and the sleeve. This arrangement prevents the sleeve and belt from interfering with one another. It can readily be appreciated that the rotating flanges 20 and 22 must be kept clear of the belt. The disc 26 will assure that the belt cannot touch the flanges. If the belt starts to walk in either direction as shown by arrow B in FIG. 2, the disc will stop it before it can get to the flanges or off the roller.

Whereas a preferred form of the invention has been shown and described, it will be realized that alterations may be made thereto without departing from the scope of the following claims.

I claim:

1. A retrofit alignment maintenance device for a conveyor belt of given width W comprising:
   a support roller extending transversely of the full width of the belt, the support roller comprising a cylindrical idler roller engaging and supporting the belt;
   a pair of mounting means each releasably attachable at any point along the length of the support roller, each mounting means including an arcuate hub which clampingly engages the roller; and
   a pair of disc members each mounted on one of the mounting means, the mounting means being located on the support member such that the disc members are displaced from each other by a given spacing S, with S being greater than W.

2. The device of claim 1 wherein each hub is split into two semi-cylindrical hub halves and each hub half has a pair of radially-extending flanges in facing relation with the flanges of the other hub half.

3. The device of claim 2 wherein each disc member is split into two arcuate disc halves, each attached to a separate one of the semi-cylindrical hub halves.

4. The device of claim 3 wherein the two disc halves of each disc member define a curved concave surface, curving away from the belt.

5. The device of claim 1 wherein each disc member defines a curved concave surface, curving away from the belt.

* * * * *